United States Patent
Tsai et al.

(10) Patent No.: US 8,590,656 B2
(45) Date of Patent: Nov. 26, 2013

(54) BATTERY HOLDING STRUCTURE FOR TWO-WHEELED VEHICLE

(75) Inventors: Feng-Chih Tsai, Kaohsiung (TW); Chien-Hung Chen, Kaohsiung (TW)

(73) Assignee: Kwang Yang Motor Co., Ltd., Kaohsiung City (TW)

( * ) Notice: Subject to any disclaimer, the term of this patent is extended or adjusted under 35 U.S.C. 154(b) by 0 days.

(21) Appl. No.: 13/609,212

(22) Filed: Sep. 10, 2012

(65) Prior Publication Data
US 2013/0105240 A1    May 2, 2013

(30) Foreign Application Priority Data
Oct. 26, 2011    (TW) .............................. 100138810 A (51) Int. Cl.
*B62D 61/02*    (2006.01)
*B62K 11/00*    (2013.01)

(52) U.S. Cl.
USPC ............................ 180/219; 180/220; 180/228

(58) Field of Classification Search
USPC .......... 180/219, 220, 225, 227, 228, 229, 230
See application file for complete search history.

(56) References Cited

U.S. PATENT DOCUMENTS

| | | | | |
|---|---|---|---|---|
| 6,176,338 B1 * | 1/2001 | Nakagawa et al. | ........... | 180/219 |
| 7,140,458 B2 * | 11/2006 | Nakagawa et al. | .......... | 180/65.1 |
| 7,594,558 B2 * | 9/2009 | Isayama | ........................ | 180/219 |
| 7,703,569 B2 * | 4/2010 | Miyabe | ......................... | 180/219 |
| 8,002,067 B2 * | 8/2011 | Nishiura et al. | ............... | 180/220 |
| 2010/0078246 A1 * | 4/2010 | Sasage et al. | ................. | 180/220 |

\* cited by examiner

*Primary Examiner* — Kevin Hurley
*Assistant Examiner* — Marc A Scharich
(74) *Attorney, Agent, or Firm* — Leong C. Lei (57) ABSTRACT

Disclosed is a battery holding structure of a two-wheeled vehicle. The two-wheeled vehicle includes a frame and a saddle. A storage box is arranged under the saddle. A power unit is arranged under the storage box. The frame is provided with a battery mounting seat. The storage box has a front end forming a shielding section. The shielding section forms a maintenance opening corresponding to the battery mounting seat. The battery mounting seat receives therein a battery to have the battery located within the range of the maintenance opening. To maintain the battery, it only needs to lift the saddle and remove the maintenance cover that covers the maintenance opening to allow the maintenance of the battery to be carried out. This simplifies the maintenance operation of the battery and also simplifies the maintenance of a nozzle of an air intake system provided for an internal combustion engine.

9 Claims, 8 Drawing Sheets

BATTERY HOLDING STRUCTURE FOR TWO-WHEELED VEHICLE

TECHNICAL FIELD OF THE INVENTION

The present invention generally relates to a battery holding structure of two-wheeled vehicle, and more particularly to a battery holding structure that facilitates simplification of battery maintenance engineering.

DESCRIPTION OF THE PRIOR ART

Figure 1:
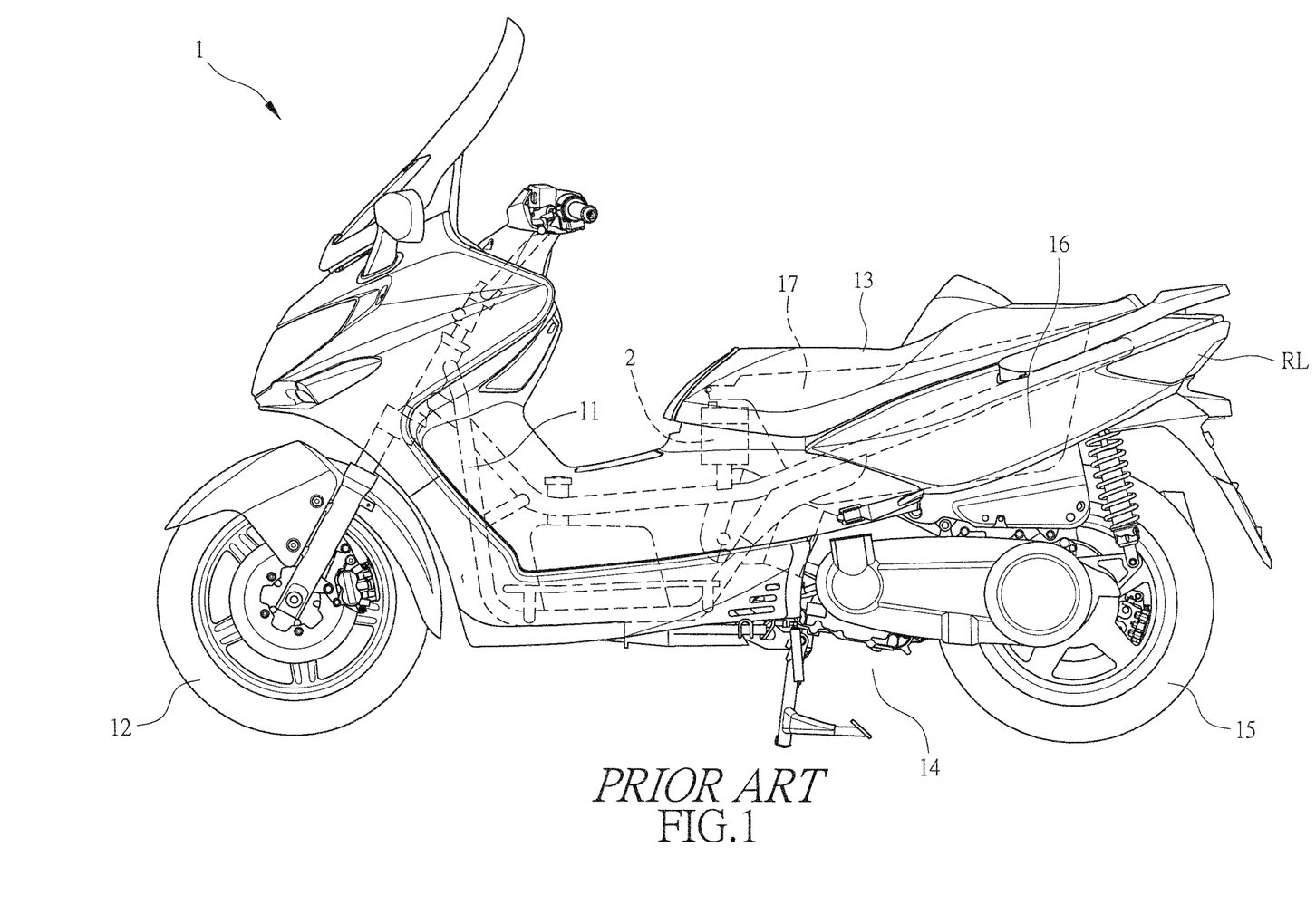
FIG. 1 is a side elevational view of a conventional two-wheeled vehicle.

As shown in FIG. 1, a two-wheeled vehicle 1 comprises a frame 11, a front wheel 12, a saddle 13, a power unit 14, a rear wheel 15, an external shell 16, and a storage box 17. The storage box 17 is arranged under the saddle 13. The power unit 14 is suspended on the frame 11 and is located under the storage box 17.

The power that moves the two-wheeled vehicle 1 forward is primarily generated from the power unit 14. To start up the operation of the power unit 14, the two-wheeled vehicle 1 is provided with a battery 2 that supplies electrical power for starting up the power unit 14. Also, the electrical power from the battery 2 is supplied as the power for operating other electrical components/devices of the two-wheeled vehicle 1.

To provide the battery 2 with stable and concealed accommodation location, the motorcycle manufacturers often provides a space under a front section of the storage box 17 so that the battery 2 can be accommodated in the space. Although providing a space under the front section of the storage box 17 to accommodate the battery 2 realizes stable and concealed accommodation location for the battery 2, yet the battery 2 itself is considered a consumable product so that replacement is necessary after the lapse of service life and constant maintenance is also needed before the expiration of the service life. In an attempt to replace or maintain the battery 2, the conventional accommodation structure for battery 2 as described above requires the saddle 13 to be opened and removed and the storage box 17 be removed from the two-wheeled vehicle 1 in order to carry out maintenance and replacement of the battery 2. The above described structure for accommodating the battery 2 undoubtedly causes trouble for the maintenance of the battery 2. Thus, it is a challenge for the motorcycle industry to provide a battery holding structure that simplifies the maintenance operation of the battery 2.

SUMMARY OF THE INVENTION

In view of the drawback of the conventional battery accommodation structure of two-wheeled vehicle that causes troubles for the maintenance operation of battery, the technical solution of the present invention aims to provide a battery holding structure of two-wheeled vehicle. The two-wheeled vehicle comprises a frame and a saddle. A storage box is arranged under the saddle. A power unit is arranged under the storage box. The frame is provided with a battery mounting seat. The storage box has a front end forming a shielding section. The shielding section forms a maintenance opening. The maintenance opening corresponds to the battery mounting seat. The battery mounting seat receives therein a battery so that the battery is located within the range of the maintenance opening. To maintain the battery, it only needs to lift and open the saddle and then remove the maintenance cover that covers the maintenance opening formed in the shielding section of the storage box to allow the maintenance of the battery to be carried out. This simplifies the maintenance operation of the battery.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 2:
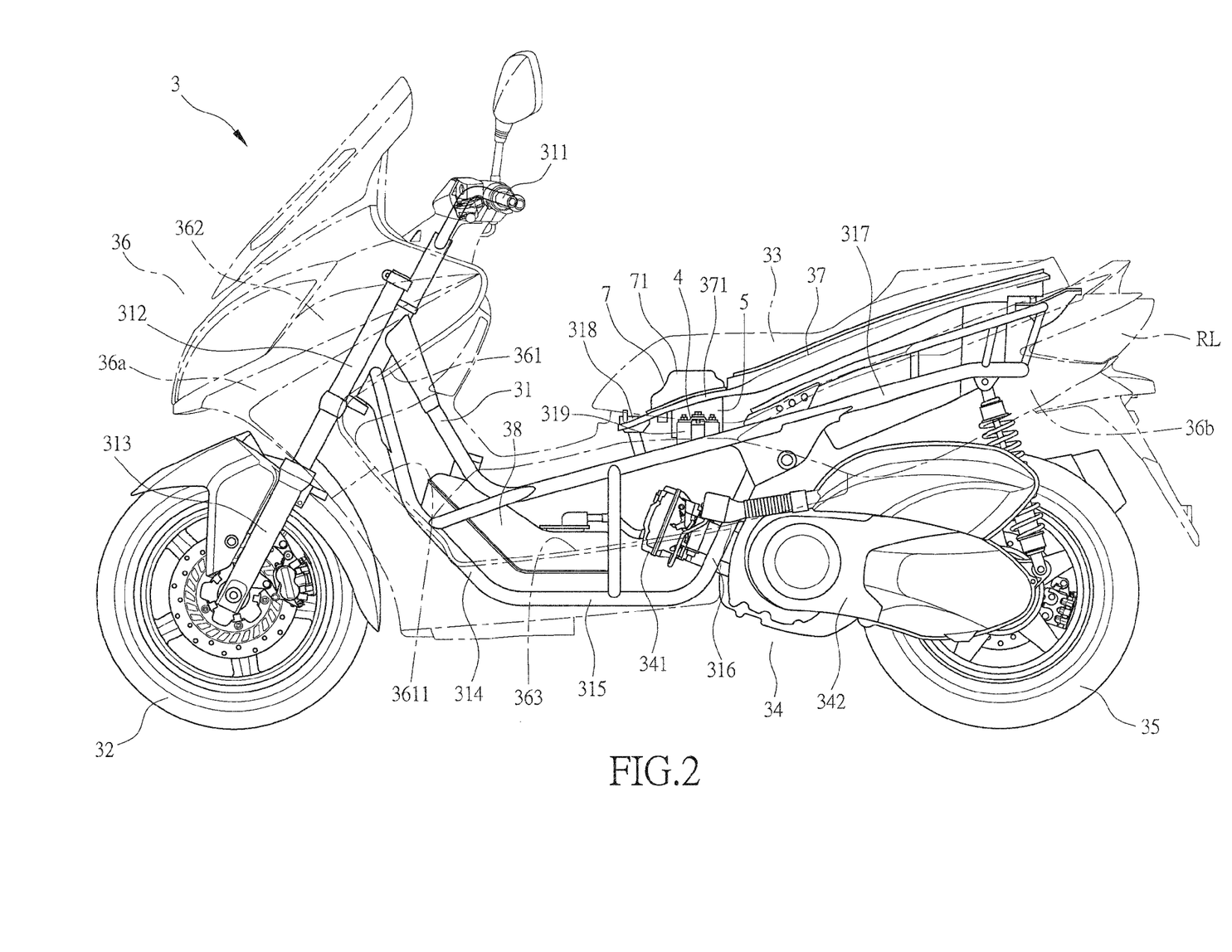
FIG. 2 is a side elevational view of a two-wheeled vehicle according to the present invention.
Figure 3:
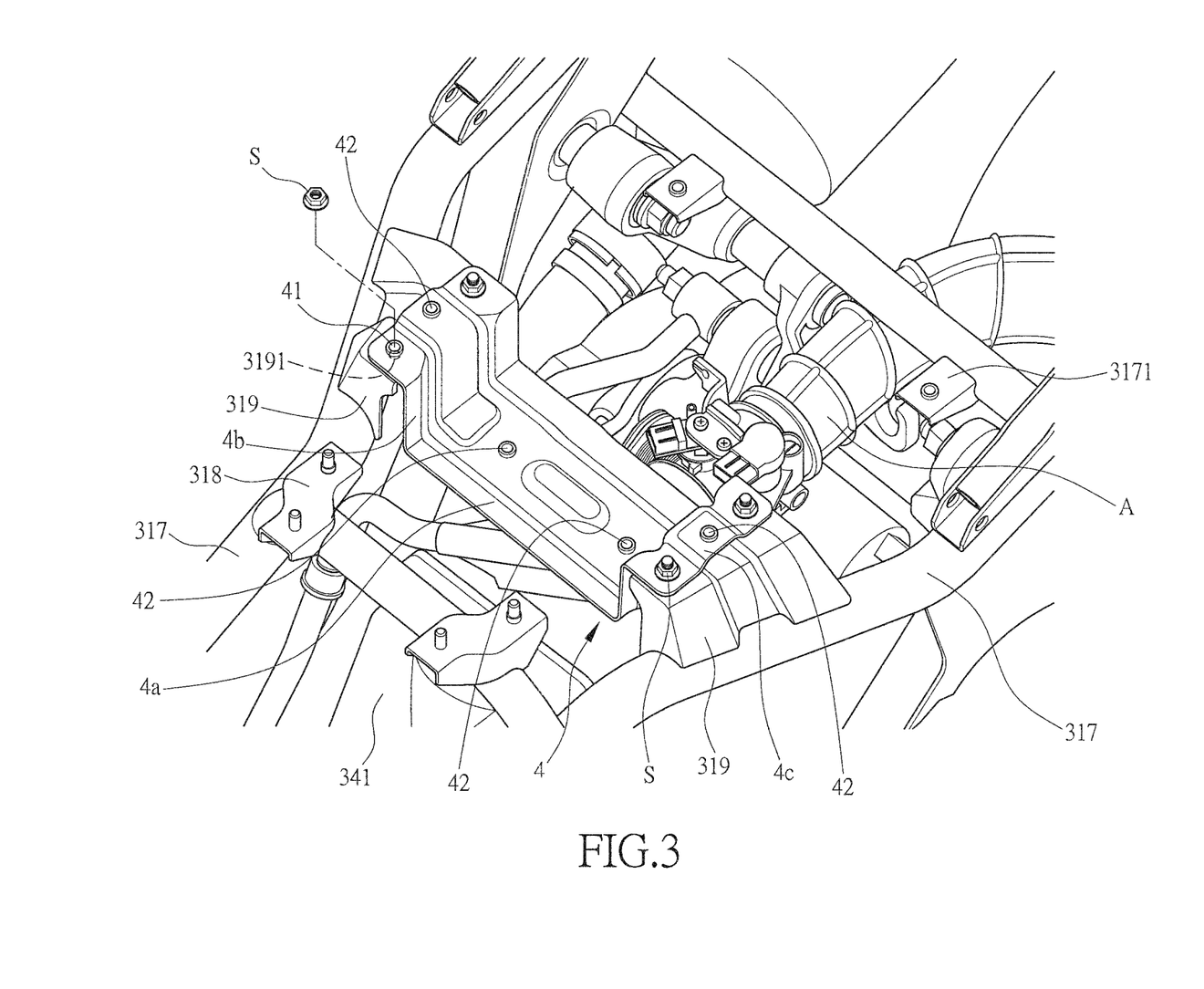
FIG. 3 is a schematic view showing a battery mounting seat and a battery support frame according to the present invention.
Figure 5:
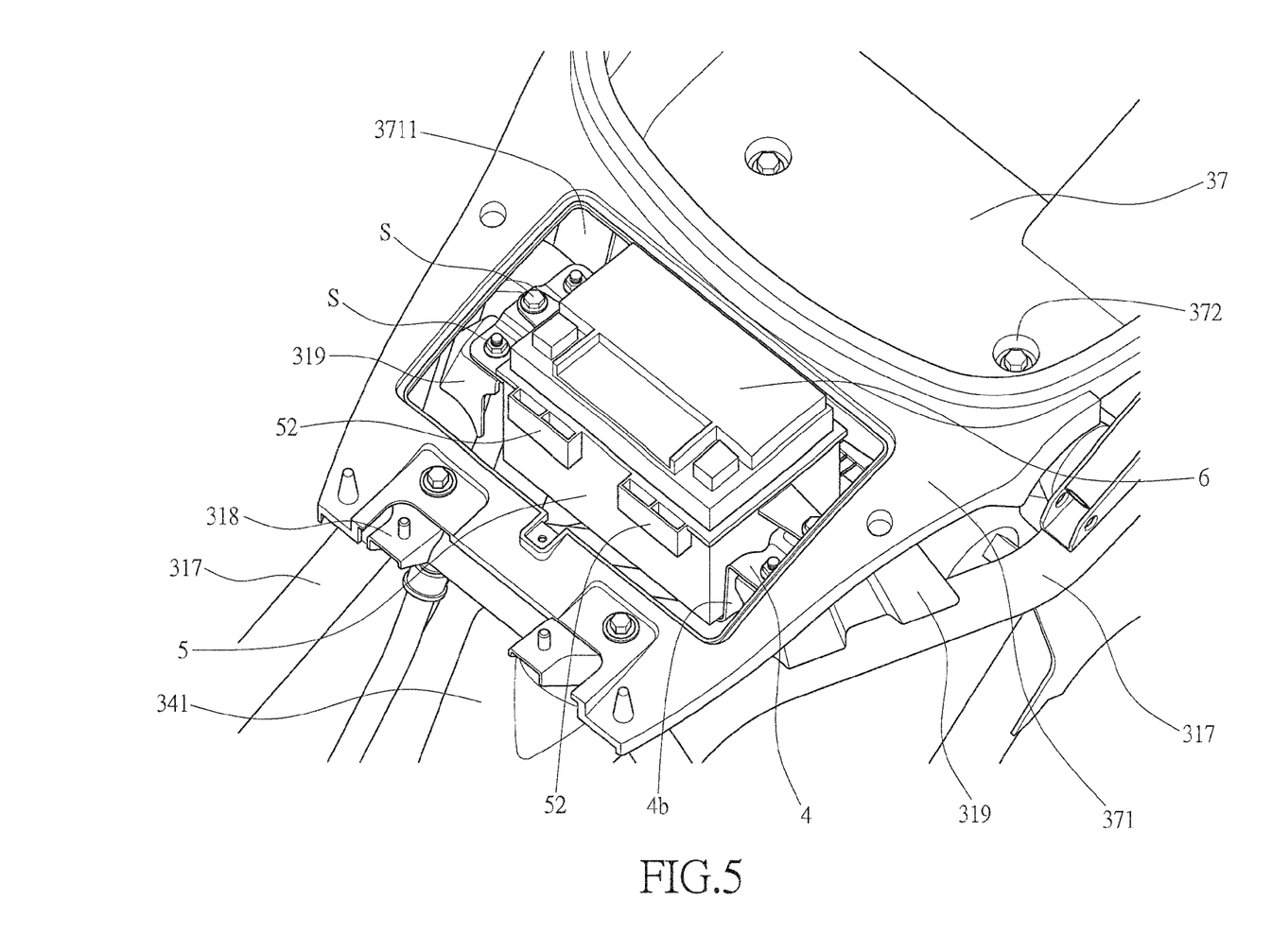
FIG. 5 is a schematic view showing a storage box and a battery according to the present invention.

Referring first to FIGS. 2, 3, and 5, the present invention provides a two-wheeled vehicle 3, which comprises a frame 31, a front wheel 32, a saddle 33, a power unit 34, a rear wheel 35, and an external shell 36.

Rotatably mounted to a front end of the frame 31 is a steering handlebar 311. Connected under the steering handlebar 311 is a head tube 312 of the frame. Pivotally mounted under the head tube 312 is a front shock absorber 313. The front wheel 32 is attached to the front shock absorber 313. Extending from the head tube 312 toward rear side of the vehicle body is down tube sections 314 of the frame. Extending from the down tube sections 314 toward the rear side of the vehicle body at two sides are a pair of left and right horizontal tube sections 315 of the frame for supporting a tread board 363. Extending from the horizontal tube sections 315 toward the rear side of the vehicle body are a pair of left and right rise tube sections 316 of the frame. Further extending from the rise tube sections 316 toward the rear side of the vehicle body are a pair of left and right rear tube sections 317 of the frame.

The frame 31 comprises a saddle mounting seat 318 arranged between the rise tube sections 316 and the rear tube sections 317. The saddle 33 is mounted to the saddle mounting seat 318 and the saddle 33 is rotatable about a pivot point defined by the saddle mounting seat 318 toward the front side of the vehicle body for opening. Further, a battery mounting seat 319 is mounted on the rear tube sections 317 toward the rear side of the vehicle body with respect to the saddle mounting seat 318. The battery mounting seat 319 receives a battery support frame 4 mounted thereto. Arranged under the saddle 33 is a storage box 37, and the storage box 37 has a front end that extends toward the front side of the vehicle body to form a shielding section 371. The shielding section 371 forms a maintenance opening 3711, which corresponds to the battery mounting seat 319. The storage box 37 is mounted respectively via the shielding section 371 and a fixing section 372 to the saddle mounting seat 318 and the storage box mounting seat 3171 so as to be fixed to the rear tube sections 317, as shown in FIG. 5. Arranged frontward of the storage box 37 and in the tread board 363 is a fuel tank 38. A power unit 34 is arranged under the storage box 37 and the power unit 34 is coupled to the rear wheel 35.

Figure 8:
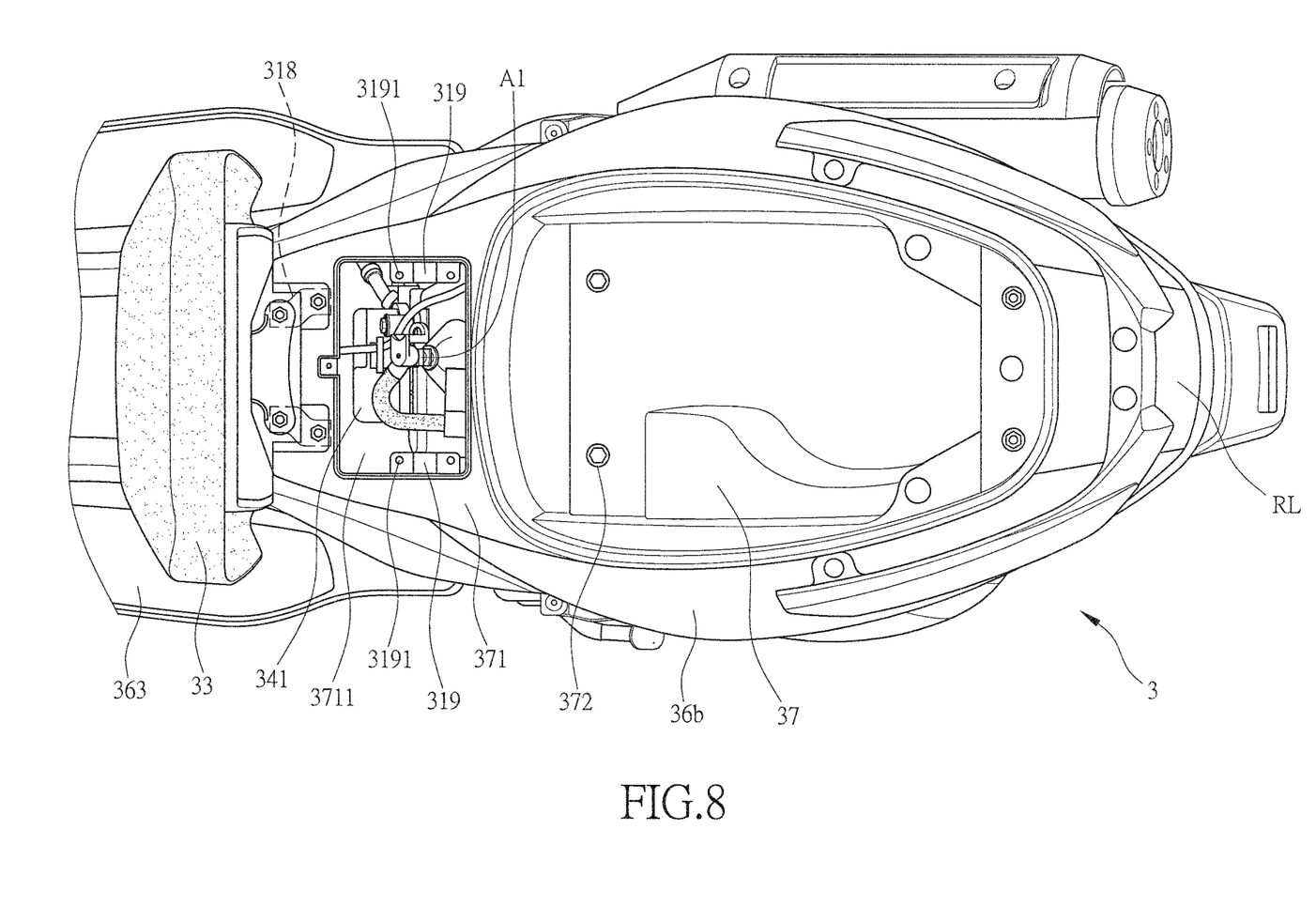
FIG. 8 is a schematic view illustrating the maintenance of a nozzle of an air intake system of an internal combustion engine according to the present invention.

The power unit 34 comprises at least an internal combustion engine 341 and a transmission box 342. The internal combustion engine 341 comprises an air intake system A. The air intake system A comprises a nozzle A1, as shown in FIGS. 3 and 8.

The external shell 36 comprises a front vehicle body cover 36a arranged frontward of the two-wheeled vehicle 3 and a side vehicle body cover 36b. The front vehicle body cover 36a comprises a knee shield 361 and a front panel 362. Extending downward from the knee shield 361 is a foot rest section 3611, which is connected, in a direction toward the rear side of vehicle, with the tread board 363. The side vehicle body cover 36b has a rear end to which a taillight set RL is mounted.

Figure 4:
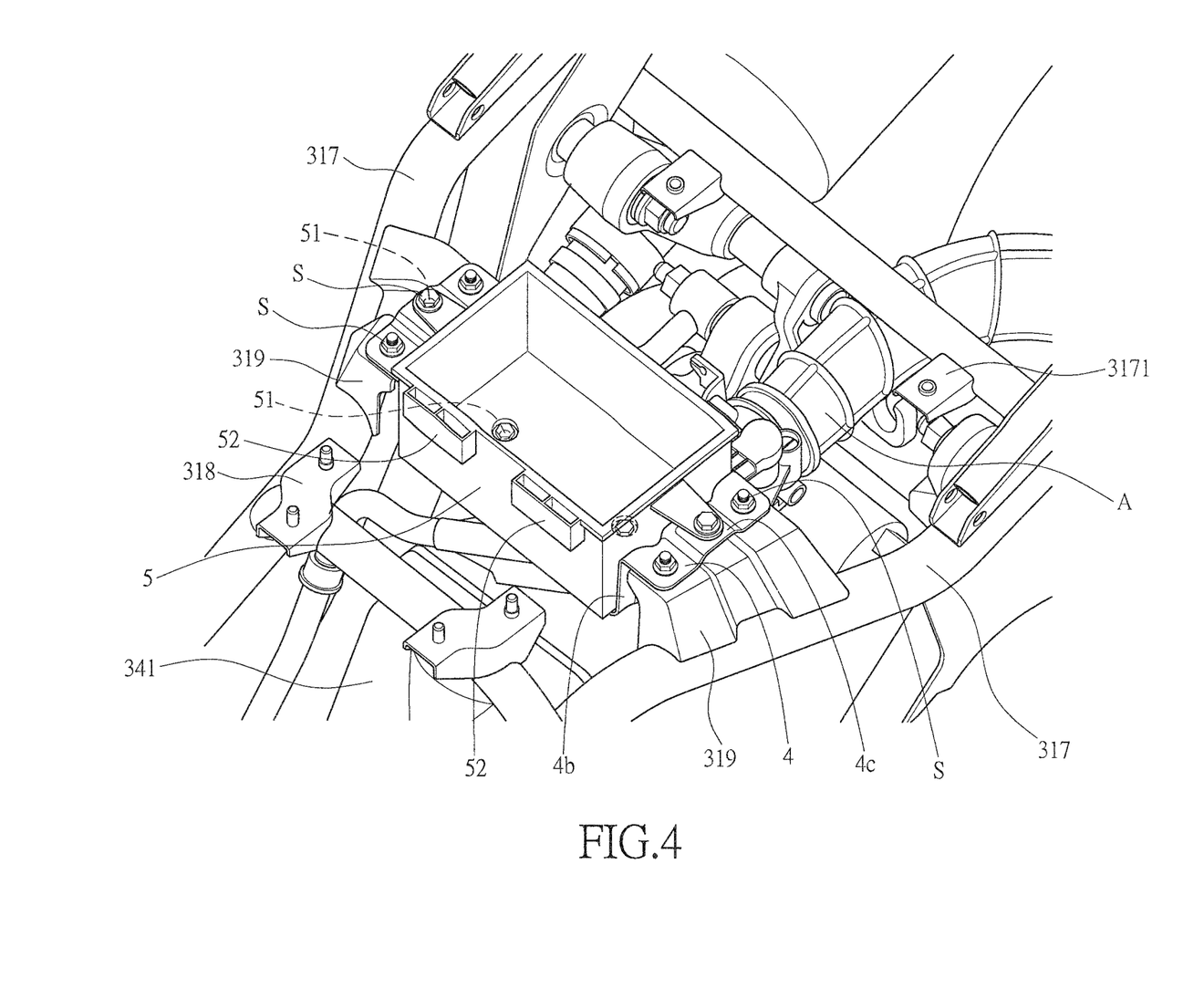
FIG. 4 is a schematic view illustrating the installation of the battery support frame and a battery case according to the present invention.
Figure 6:
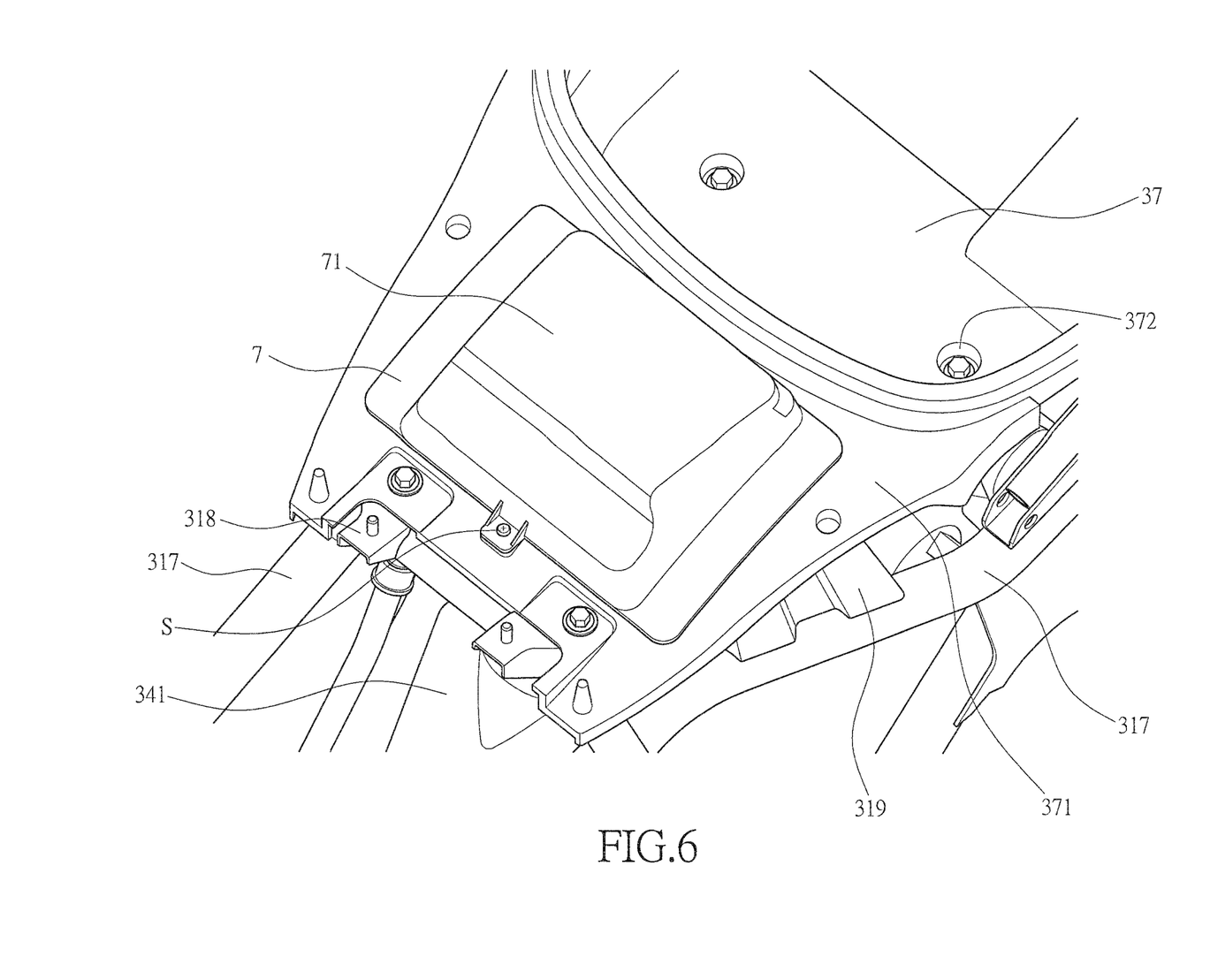
FIG. 6 is a schematic view of a maintenance cover according to the present invention.

Referring to FIGS. 3, 4, 5, and 6, the battery holding structure of two-wheeled vehicle according to the present invention is generally structured so as to arrange the battery mounting seat 319 on the rear tube section 317 of the frame 31 and to mount the battery support frame 4 to the battery mounting seat 319. The battery support frame 4 comprises a bottom 4a, two side walls 4h extending upward from left and right side edges of the bottom, and positioning sections 4c extending from the two side walls. Further, the battery support frame 4 forms a plurality of bolt holes 41 and fixing holes 42, in which the bolt holes 41 are formed in the positioning sections 4c of the battery support frame 4, whereby threaded fastening elements S are received through the bolt holes 41 to securely screw the battery support frame 4 to fastening holes 3191 of the battery mounting seat 319. Two side walls 4b of the battery support frame 4 delimit therebetween a space that is sufficient to accommodate a battery case 5, whereby the battery case 5 is secured to the fixing holes 42 of the battery support frame 4 with threaded fastening elements S received in through holes 51 defined in the battery case 5 and thus, the battery case 5 is securely fixed on the battery mounting seat 319. As such, the battery case 5 and the battery support frame 4 can be mounted in a compact arrangement. Further, the battery 6 is received and held in the battery case 5 in such a way that the vertical height of the battery 6 after being received can be reduced thereby allowing a thick cushion can be provided on the saddle 33 to maintain comfortableness of sitting on the saddle 33. Further, the battery case 5 is provided with a spare fuse holder 52, which functions to receive and hold spare fuses. As shown in FIGS. 4, 5, and 6, after the battery case 5 is mounted to the battery mounting seat 319, the storage box 37 can be mounted to the rear tube sections 317 in such a way that the maintenance opening 3711 formed in the shielding section 371 of the storage box 37 is located exactly above the battery case 5 and the battery 6. In other words, the battery 6 and the spare fuse holder 52 of the battery case 5 are exposed through the maintenance opening 3711. This provides improved concealment of the battery 6. A maintenance cover 7 is provided on and covers the maintenance opening 3711. The maintenance cover 7 comprises a raised portion 71, which helps concealing the battery 6 and the spare fuse holder 52 of the battery case 5. In other words, the battery 6 and the battery case 5 are located under the raised portion 71 so that with such a raised portion 71, the battery 6 and the battery case 5 can be accommodated under the saddle 33 and the battery 6 and the battery case 5 can be shielded to prevent unexpected contact that might lead to undesired conduction of electricity. The maintenance cover 7 can be secured by a threaded fastening element S to the shielding section 371 of the storage box 37.

Figure 7:
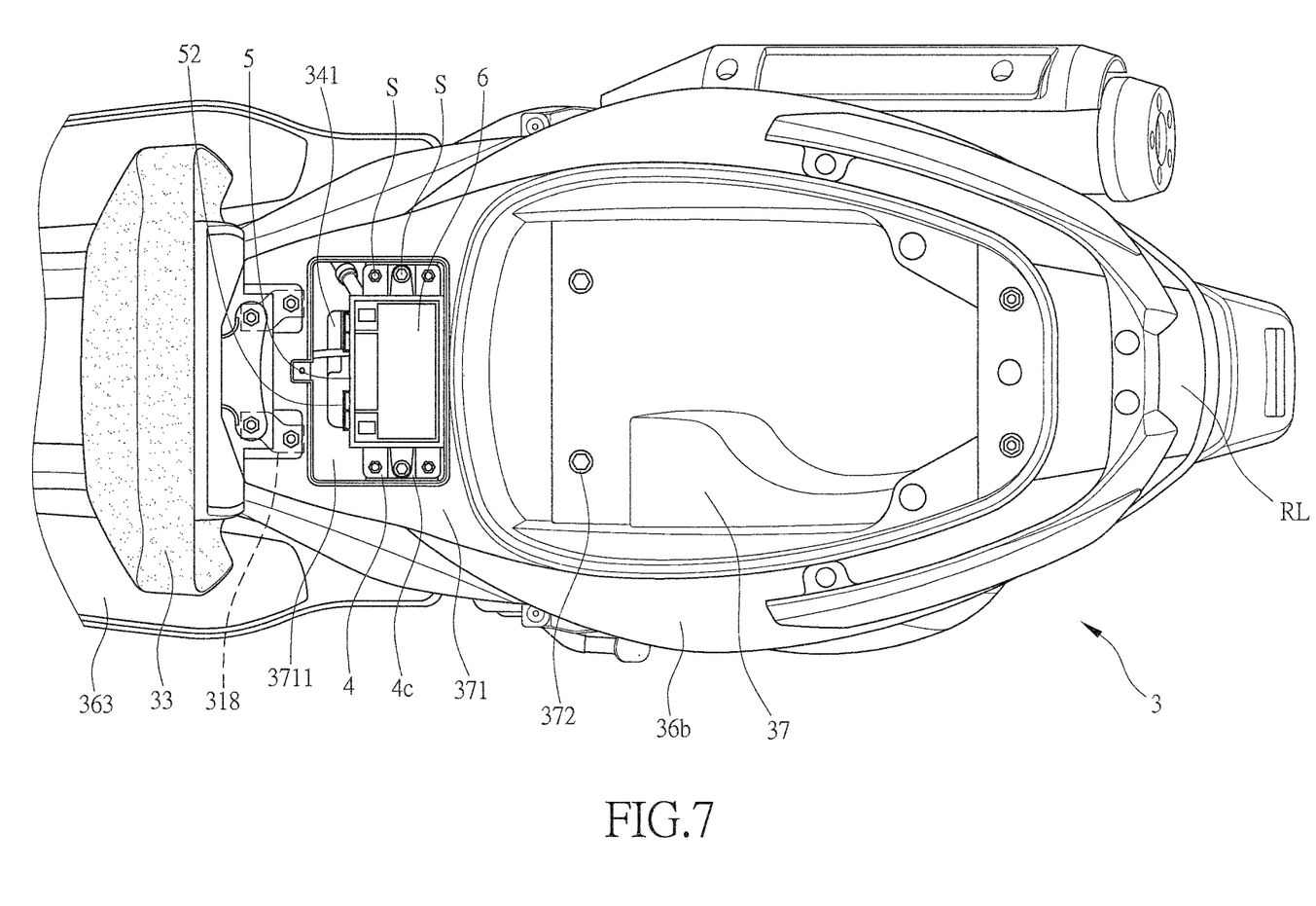
FIG. 7 is a schematic view illustrating the maintenance of battery according to the present invention.

In practicing the present invention, as shown in FIG. 7, to maintain the battery 6, it only needs to lift and open the saddle 33 and remove the maintenance cover 7 that covers the maintenance opening 3711 formed in the shielding section 371 of the storage box 37, and then maintenance of the battery 6 can be carried out. This arrangement simplifies the maintenance operation of the battery 6. It is also noted that with the above described holding structure of battery 6 according to the present invention, a maintenance operation of a nozzle A1 of an air intake system A provided for the internal combustion engine 341 may also be made simple. As shown in FIGS. 3 and 8, since the nozzle A1 of the air intake system A provided for the internal combustion engine 341 is located under the battery support frame 4 and is thus shielded by the battery support frame 4, when an attempt is made to maintain the nozzle A1 of the air intake system A provided on the internal combustion engine 341, similarly, it only needs to lift and open the saddle 33 and remove the maintenance cover 7 that covers the maintenance opening 3711 formed in the shielding section B71 of the storage box 37 to allow the battery 6 and the battery support frame 4 to be removed so as to expose the nozzle A1 of the air intake system A through the maintenance opening 3711 of the shielding section 371 of the storage box 37 to allow the maintenance operation to be carried out on the nozzle A1 of the air intake system A.

The efficacy of the present invention is that the battery mounting seat 319 is mounted on the rear tube sections 317 of the frame 31 and the battery support frame 4 is secured to the battery mounting seat 319, so that the battery support frame 4 may receive the battery case 5 to fixed thereon and the battery case 5 may receive the battery 6 to be held therein. Meanwhile, the front end of the storage box 37 is extended to form the shielding section 371, which forms the maintenance opening 3711 in such a location to exactly correspond to the battery case 5 so that the battery 6 received and held in the battery case 5 is located under the shielding section 371 and is exposed through the maintenance opening 3711. Further, the maintenance opening 3711, the battery 6, and the nozzle A1 of the air intake system A provided on the internal combustion engine 341 are arranged in a vertically stacked manner to have projections thereof overlapping each other so that the nozzle A1 of the air intake system A is located within the range of the maintenance opening 3711. With the above described holding structure of battery 6, the present invention may simplify the maintenance of the battery 6 and allows maintenance operations of the nozzle A1 of the air intake system A to be carried out without removing components such as the saddle 33, the storage box 37, and the external shell 36. This simplifies the maintenance of the nozzle A1 of the air intake system A provided on the internal combustion engine 341.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A battery holding structure of a two-wheeled vehicle, wherein the two-wheeled vehicle comprises a frame and a saddle, a storage box being arranged under the saddle, a power unit being arranged under the storage box, characterized in that the frame is provided with a battery mounting seat located outside and separate from the storage box, the storage box having a front end forming a shielding section, the shielding section forming a maintenance opening, the maintenance opening corresponding in position in a vertical direction to the battery mounting seat, wherein the battery mounting seat receives a battery support frame mounted thereon and the battery support frame receives a battery case mounted thereto, the battery case receiving therein a battery so that the battery is located within a range of dimension of an outer circumference of the maintenance opening.

2. The battery holding structure of the two-wheeled vehicle according to claim 1, wherein an air intake system of an internal combustion engine of the power unit is located under the battery support frame.

3. The battery holding structure of the two-wheeled vehicle according to claim 2, wherein the air intake system comprises a nozzle, the nozzle being shielded by the battery support frame.

4. The battery holding structure of the two-wheeled vehicle according to claim 3, wherein the nozzle is located within the range of the maintenance opening.

5. The battery holding structure of the two-wheeled vehicle according to claim 1, wherein the battery case receives the battery therein, the battery support frame forming fixing holes so that the battery case is secured by threaded fastening elements to the battery support frame.

6. The battery holding structure of the two-wheeled vehicle according to claim 1, wherein a maintenance cover is provided on and covers the maintenance opening, the maintenance cover comprising a raised portion, the battery is located under the raised portion.

7. The battery holding structure of the two-wheeled vehicle according to claim 1, wherein the battery support frame comprises a bottom, two side walls extending upward from left and right side edges of the bottom, and positioning sections extending from the two side wall.

8. The battery holding structure of the two-wheeled vehicle according to claim 1, wherein the battery case comprises a spare fuse holder, which is located in the range of the maintenance opening.

9. The battery holding structure of the two-wheeled vehicle according to claim 1, wherein the frame comprises a saddle mounting seat, to which the saddle and the shielding section of the storage box are mounted.

* * * * *